United States Patent [19]

Turloff

[11] 3,849,898
[45] Nov. 26, 1974

[54] ELEVATION INDICATING APPARATUS

[76] Inventor: Harry E. Turloff, 3378 Clyde Dr., Port Huron, Mich. 48060

[22] Filed: Aug. 9, 1972

[21] Appl. No.: 279,241

[52] U.S. Cl. ............................................... 33/367
[51] Int. Cl. ............................................. G01c 5/04
[58] Field of Search .................. 33/367, 377, 147 C

[56] References Cited
UNITED STATES PATENTS

| | | | |
|---|---|---|---|
| 327,564 | 10/1885 | MacDonald | 33/367 |
| 547,864 | 10/1895 | Sherman | 33/367 |
| 914,945 | 3/1909 | Gutwein | 33/367 |
| 1,042,248 | 10/1912 | McGowan | 33/367 |
| 1,463,738 | 7/1923 | Dickinson | 33/367 |
| 1,599,347 | 9/1926 | Purkey | 33/367 |
| 2,614,572 | 10/1952 | Wisney | 33/367 X |
| 2,789,364 | 4/1957 | Selleck | 33/377 |
| 3,015,167 | 1/1962 | Chapman | 33/367 |
| R13,240 | 5/1911 | Gutwein | 33/367 |

Primary Examiner—John W. Huckert
Assistant Examiner—Jon W. Henry
Attorney, Agent, or Firm—Clarence A. O'Brien; Harvey B. Jacobson

[57] ABSTRACT

A pair of upright stands are provided and include enlarged bases by which the stands may be supported on variously elevated support surfaces. Each of the stands has a vertically elongated support mounted thereon for adjustable vertically positioning therealong. Each stand has a double scale having a center point thereon by which the corresponding support may be precisely adjusted above and below a predetermined position on the stand and each support includes a similar double scale reading in opposite directions. Each support includes structure for supporting a transparent hose end in vertical position thereon and for adjustable vertical shifting along the support. Also, each support includes a second double scale thereon which is double the first scale and the first and second scales on each support include center points which are horizontally aligned and registrable with the center point on the scale formed on the corresponding stand. A pointer is provided on each support for vertical positioning therealong and registry with the second scale of the support and a hose extends between the supports and has its opposite ends extending upwardly along and adjustably supported from the corresponding supports, each hose end including a manually operable air valve.

10 Claims, 4 Drawing Figures

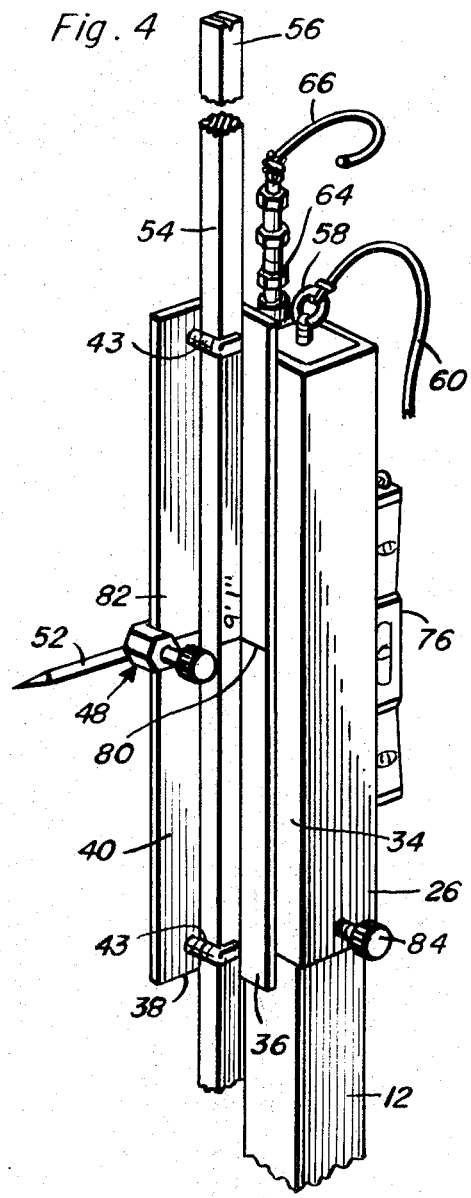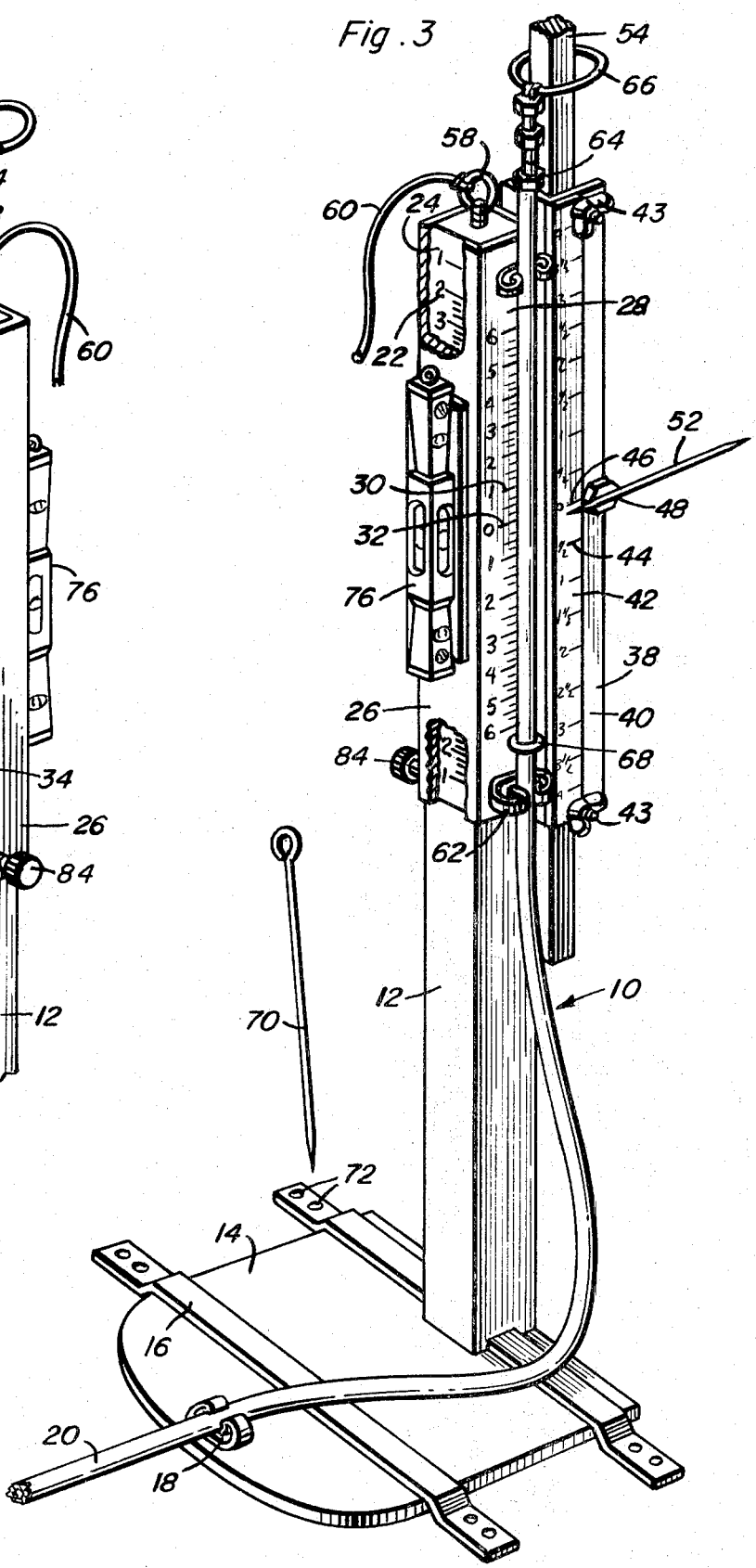

ELEVATION INDICATING APPARATUS

The elevation indicating apparatus of the instant invention has been designed to provide a means whereby similar elevations may be indicated at horizontally remote points. In addition, the elevation indicating apparatus may also be used to indicate a selected drop in elevation between horizontally remote points.

There are many instances in the building and construction trades wherein it is desired to establish similar or dissimilar elevations at horizontally remote points. The elevation indicating apparatus of the instant invention utilizes a pair of stands which support the opposite ends of a transparent section of hose that may have clear or colored liquid disposed therein and the apparatus may therefore be utilized to indicate similar horizontally remote elevations in that the level of liquid within the upwardly extending opposite ends of the hose connecting the stands will be disposed at the same level. Also, by means of the various scales which are fixed and also vertically shiftable relative to the stands specific dissimilar elevations may be indicated at horizontally remote locations.

The main object of this invention is to provide an apparatus that may be utilized not only to indicate identical elevations at horizontally remote locations but also specific dissimilar elevations at the same locations.

Another object of this invention, in accordance with the preceding object, is to provide an elevation indicating apparatus utilizing a connecting hose having transparent opposite ends and which may have liquid disposed therein in order that the level of liquid in each hose end at horizontally remote locations may be the same when the hose ends are disposed in upwardly projecting positions and open to the ambient atmosphere.

Yet another object of this invention, in accordance with the immediately preceding object, is to provide an elevation indicating apparatus in accordance with the immediately preceding object and including manually operable air valves on the opposite ends of the hose whereby the liquid within the hose may be maintained therein even though one end of the hose is elevated or lowered excessively during transport to a remote location.

Another important object of this invention is to provide an elevation indicating apparatus having various scales thereon to facilitate the use of the elevation indicating apparatus in various environments.

A final object of this invention to be specifically enumerated herein is to provide an elevation indicating apparatus in accordance with the preceding objects which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
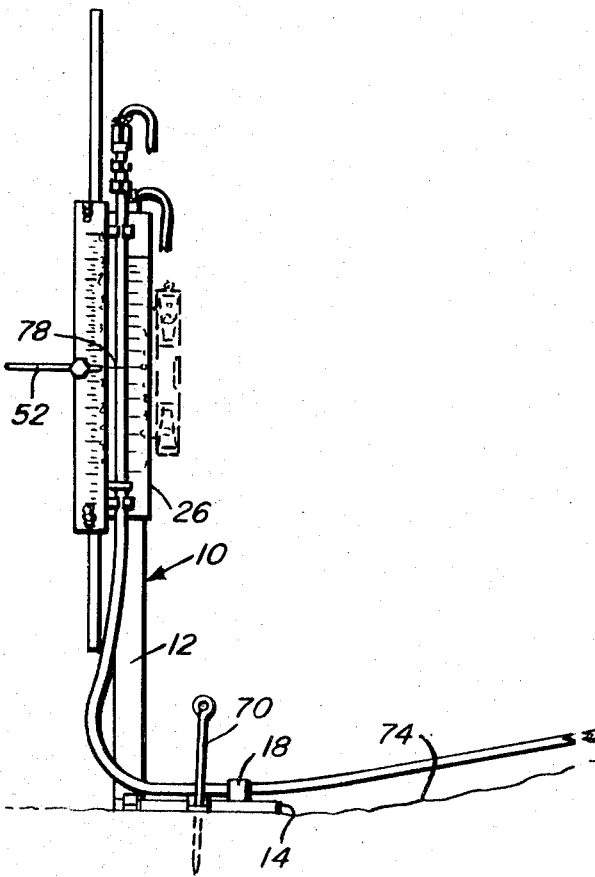
FIG. 1 is a side elevational view of the elevation indicating apparatus of the instant invention with the stands thereof disposed at horizontally remote locations and the level of liquid in the ends of the connecting hose indicating the difference in the elevation of the surfaces upon which the stands are disposed.

FIG. 3 is a perspective view of one of the stands of the elevating indicating apparatus and the associated apparatus components, portions of the vertically shiftable support on the stand being broken away to illustrate the underlying double scale on one side of the stand; and FIG. 4 is a fragmentary perspective view of the upper portion of the assembly illustrated in FIG. 3 as seen from the background of FIG. 3.

Referring now more specifically to the drawings, the numeral 10 generally designates the elevation indicating apparatus of the instant invention. The apparatus 10 includes a pair of upright stands 12 including horizontal bases 14 provided with anchoring straps 16 by which the bases 14 may be secured to any suitable support surface. In addition, each base 14 includes a hose clamp 18 for clampingly engaging the corresponding end portion of a length of transparent hose 20 which extends between the stands 12.

Each stand 12 has a double scale 22 formed on one side face 24 thereof and the upper end of the scale ascends downwardly to a centerpoint while the lower end of the scale 22 ascends upwardly to the centerpoint, the centerpoint of the scale 22 being disposed 2 feet above the underside of the corresponding base 14.

Each stand 12 has a support sleeve 26 telescopingly engaged thereover for guided vertical shifting along the stand 12. A side 28 of the sleeve 26 adjacent the side 22 of the standard 12 has a second double scale 30 formed thereon and the double scale 30 includes a centerpoint 32 and ascends upwardly above the centerpoint 32 and descends downwardly below the centerpoint 32. When the upper end of the sleeve 26 is flush with the upper end of the stand 12, the centerpoint 32 of the scale 30 is horizontally registered with the centerpoint of the scale 22.

The side 34 of the sleeve 26 remote from the side 24 of the standard 12 has one flange 36 of an angle iron 38 secured thereto and a second flange 40 of the angle iron 38 generally parallels the side 28 of the sleeve 26 and has a double scale member 42 secured thereto by means of fasteners. The double scale member 42 has a double scale 44 thereon having a centerpoint 46 horizontally registered with the centerpoint 32 and the double scale 44 ascends upwardly from the centerpoint 46 and downwardly from the centerpoint 46, the scale 44 being double the scale of the scale 30.

Figure 2:
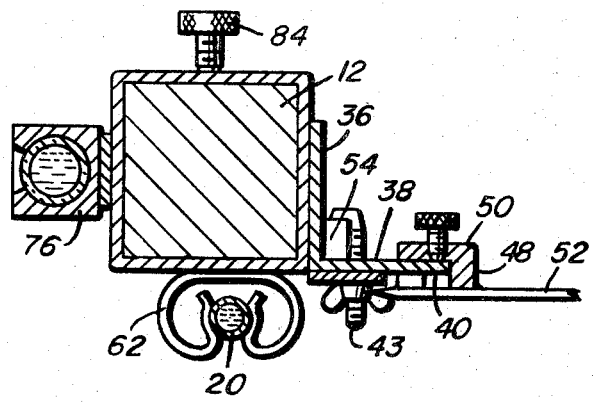
FIG. 2 is an enlarged horizontal sectional view taken substantially upon the plane indicated by the section line 2—2 of FIG. 1.

A pointer assembly 48 (see FIG. 2) is clampingly supported from the flange 40 for adjustable shifting therealong by means of a releasable clamp assembly 50 from which the pointer element 52 of the pointer assembly 48 is supported and the fasteners 43 secured through the double scale member 42 and the flange 40 comprise clamp members clampingly supporting a vertically extendible rod 54 in the inside corner defined by the angle iron 38. The upper end of each rod 54 is provided with an upwardly opening transverse notch or groove 56, see FIG. 4.

The upper end of each support 12 has an eye anchor 58 secured thereto and one end of an elongated flexible strap or lace 60 is anchored to the eye anchor 58 so that the standard 12 may be readily carried by the strap 60.

Each support sleeve 26 includes a hose clamp 62 corresponding to the hose clamps 18 and the terminal ends of the hose 20 are provided with manually openable air and water valves 64 having suspension laces 66 anchored thereto. In addition, each of the hose ends includes a ring marker 68 slidable thereon and frictionally retained in adjusted position. Also, each of the stands includes a plurality of small diameter spikes 70 which may be inserted through the apertures 72 in the opposite ends of the anchor strap 16 in variously inclined positions so as to anchor the bases 14 to a ground surface such as that designated by the reference numeral 74 in FIG. 1. Finally, each of the support sleeves 26 has a torpedo level 76 magnetically supported therefrom so as to provide a means whereby the stands 12 may be shimmed, if necessary, in order to be supported in vertical positions from the surfaces upon which the bases 14 rest.

Of course, the elevation indicating apparatus may be utilized in the simplest manner to indicate identical elevations in horizontally remote locations in the manner illustrated in FIG. 1 of the drawings wherein identical elevations at the remote locations of the stands 12 are indicated at the levels 78 of the liquid within the hose 20. It will of course be noted, however, that the pointer element 52 of the right-hand assembly is at an elevation approximately 5¾ inches above the elevation of the pointer 52 of the left-hand assembly.

In addition to such simple horizontally remote elevation indicating instances, it will be noted from FIG. 4 of the drawings that the inside corner of each angle iron 38 is provided with a mark 80 horizontally registered with the center points 32 and 46 and with which a similar mark 82 on the rod 54 may be registered in order to indicate the elevation of the upper end of the rod 54 above the center points of the scales 30 and 44. Of course, a cord stretched between the notched upper ends of the rods 54 and the sleeves 26 adjusted at the same elevation and secured in position by means of the set-screws 84 engaged with the stands 12, the string or cord will define a constant elevation reference line extending between the stands 12 which may be utilized to advantage in erecting a suspended ceiling.

Further, the air valves 64 enable one of the stands to be positioned as desired and the second stand to then be carried to a remote location without concern as to extreme changes in elevation through which the second stand is moved while being transported to the remote location. The air valves 64 will prevent loss of any of the liquid within the hose 20 during transport of one of the stands through extremes in elevation. Of course, once the two stands have been properly positioned, the two air valves 64 must be opened. However, if desired, after the first stand has been initially erected, it is only necessary to close the air valve 64 of the second stand during its transport through extreme changes in elevation to the predetermined remote location, inasmuch as the closure of one air valve 64 will prevent shifting of the fluid column within the hose 20, as long as the changes in elevation through which the second stand is moved does not include elevations considerably higher than the elevation of the first stand.

The scale 44 is provided in double scale in relation to the scale 30 inasmuch as the indication of a difference in elevation on the second stand moved to a remote location actually represents one half the indicated change in elevation of the second stand 12. Also, the pointer assembly 48 is useful in indicating certain elevations on a wall along which the associated stand may be placed. Still further, the adjustability of the support sleeves 26 vertically along the corresponding stands 12 is useful in horizontally aligning the scales 30 and 44 on the two sleeves 26 when the corresponding stands are disposed at different elevations and the scale 22 is useful in determining the different elevations in which the stands are positioned in such instances. Accordingly, it may be seen that the various scales 22, 30, 44 and indicating marks 80 and 82 as well as the pointer assemblies 48 may be utilized in numerous situations in order not only to determine identical elevations at remote locations but desired differences in elevation at remote locations.

In operation, the stands 12 may be positioned relative to each other as illustrated in FIG. 1 and the hose 20 may have a quantity of liquid disposed therein so that the level of the liquid in the opposite end portions of the hose 20 is registered with the corresponding scales 30. The opposite end portions of the hose 20 supported from the supports or support sleeves 26 may be considered as tubular members between the lower ends of which the remaining integral portions of the flexible hose 20 extends.

After the stand, at the left of FIG. 1, has been initially set up with the upper and lower ends of the corresponding support sleeve 26 registered with the upper and lower ends of the scale 22 and the stand 12 at the right of FIG. 1 has been placed in position, the end of the hose 20 supported from the right hand stand 12 is vertically adjusted relative to the clamps 62 until such time as the level of water within the hose end supported from the left hand stand 12 is at the level 78 indicated in FIG. 1. Then, with the assumption that the support sleeves 26 are each centered relative to the scales 22, the level 78 in the hose end supported from the right hand stand 12 will indicate the difference in elevation between the ground surfaces upon which the bases 14 are disposed.

Although it has heretofore not been appreciated, if the stands 12 were both initially set up at the left hand location in FIG. 1 with the liquid levels 78 centered on the scales 30, subsequent movement of the right hand standard 12 to the position thereof illustrated in FIG. 1 does not necessarily result in the liquid level 78 on the right hand stand 12 in FIG. 1 giving a correct indication of the difference in elevation of the stands 12. Inasmuch as substantially all flexible hoses, such as the hose 20, are capable of stretching, radially expanding or radially contracting, the change in elevation of one of the standards 12 causes a change in the elevation of the liquid level in the hose end supported from the upper standard 12. It is, therefore, imperative that at least one of the hose ends be supported from the corresponding support sleeve 26 for vertical adjustment relative thereto, whereby after the change in elevation of one of the standards 12, the hose end supported therefrom may be vertically adjusted relative to the corresponding support sleeve in order to register the liquid level in the other hose end with the center of the corresponding scale 30. After adjustment of the hose end supported from the standard 12 whose elevation has been changed, the level 78 of liquid in the adjusted hose end will indicate, by registry with the corresponding scale 30, the difference in elevation between the ground surfaces on which the standards 12 are disposed.

In the event the change in elevation is too great to maintain the level 78 in the hose end supported from the right hand standard of FIG. 1 in registry with the corresponding scale 30, the corresponding support 26 may be adjusted relative to that standard 12 and the change in elevation indicated by the level 78 on the right hand scale 30 may be added to the amount of vertical adjustment of the corresponding support sleeve 26 as indicated by the corresponding scale 22. Still further, if the change in elevation, by the adjustment of the corresponding hose end and the corresponding support sleeve 26 still does not enable proper registry of the liquid level with the scale 30, the corresponding rod 54 may be adjusted in height whereby the upper end of that rod 54 may be registered with a desired elevated object and the known height of the rod above the mark 82 and the elevation of the mark 82 above the mark 80 may be added to the readings of the scales 22 and 30.

While the above foregoing description of the use of the elevation indicating apparatus 10 is believed to adequately set forth one manner in which the apparatus 10 may be used, it is to be understood that the various adjustment features of the elevation indicating scales may be used in further ways. However, in substantially each instance of use of the apparatus 10, it is imperative that the ends of the hose 20 be vertically adjustable, by means of the clamps 62, relative to the scales 30 on the support sleeves 26 in order that the hose end on the standard 12 whose elevation is changed may be adjusted in order to realign the liquid level in the other hose end with the center of the corresponding scale 30.

Further, the hose ends are removably supported from the clamps 62 and have marker rings 68 slidable thereon and frictionally retained in adjusted position. If a particular elevation determining operation may be more readily carried out by removing the hose ends from the support sleeves 26 because of space limitations or other reasons, the ring 68 on one hose end may be positioned at one elevation and the other hose end may be adjusted vertically so as to properly register the liquid level in the first hose end with the corresponding ring. Then, the other ring may be adjusted along the corresponding hose end to the desired elevation and the distance between that elevation and the corresponding liquid level may be measured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pair of upright stands, a pair of supports mounted on said stands for adjustable positioning therealong, clamp means carried by each of said supports, transparent vertical tubular members removably supported from said supports by said clamp means for adjustable longitudinal shifting relative to said supports, a flexible hose section extending between and communicating the lower ends of said tubular member, said stands including vertically extending first scales thereon relative to which said supports are adjustable, said scales each including predetermined portions thereof spaced the same distance above the lower ends of said stands, said predetermined portions of said first scales comprising corresponding mid-portions thereof, said first scales each comprising a double scale including top-to-bottom reversed upper and lower sections thereof extending above and below the corresponding predetermined portion thereo, each of said supports having a vertically extending second scale thereon corresponding to the first mentioned scale but with the upper and lower sections thereof reversed top-to-bottom relative to the corresponding upper and lower sections of the first scales, said tubular members being longitudinally shiftable relative to the corresponding second scales, said supports comprising sleeve members slidable on said stands, the upper and lower ends of said supports including portions registered relative to corresponding portions of the upper and lower sections of the corresponding first scales when said supports are in predetermined positions on said stands.

2. The combination of claim 1 wherein said supports each has a vertically extending third scale thereon corresponding to said second scales, but with the scale of each third scale one half the scale of the second scale.

3. The combination of claim 2 including a horizontal pointer assembly supported from and vertically shiftable along each of said supports in registry with the third scale thereof.

4. The combination of claim 1 wherein the upper end portions of said tubular members include manually actuatable valves for fluid-tight closing of said upper end portions.

5. The combination of claim 1 wherein each of said tubular members includes a ring member disposed thereabout, shiftable therealong and frictionally retained in adjusted position on the corresponding tubular member.

6. The combination of claim 1 wherein said stands include enlarged bases carried by their lower end portions adapted to be disposed on a suitable supporting surface and to support said stands in upright positions from said surface.

7. The combination of claim 6 wherein said bases include upstanding bores formed therethrough, and a plurality of headed anchor spikes insertable through said bores.

8. The combination of claim 1 wherein each of said supports includes a level for indicating when the corresponding stand is disposed in a vertical position.

9. The combination of claim 1 including an upright extension rods supported from said supports for adjustable lengthwise extension and retraction relative thereto.

10. The combination of claim 9 wherein said rods and supports including registrable indicia, which upon proper vertical adjustment of said supports on said stands, are registrable with said predetermined portions of said scales.

* * * * *